United States Patent [19]

Merki et al.

[11] 4,316,111
[45] Feb. 16, 1982

[54] LAMINATED SALIENT FIELD POLE PIECE FOR DYNAMOELECTRIC MACHINES

[75] Inventors: Josef Merki, Würenlingen; Hans-Werner Stankowski, Wettingen; Franz Stöckli, Birrhard, all of Switzerland

[73] Assignee: BBC Brown, Boveri & Company, Ltd., Baden, Switzerland

[21] Appl. No.: 91,199

[22] Filed: Nov. 7, 1979

[30] Foreign Application Priority Data

Dec. 14, 1978 [CH] Switzerland .............. 12713/78

[51] Int. Cl.$^3$ .................................... H02K 1/28
[52] U.S. Cl. ................................. 310/218; 310/269
[58] Field of Search ............. 310/184, 269, 216–218, 310/42, 261, 254, 259, 260, 270

[56] References Cited

U.S. PATENT DOCUMENTS

| | | | |
|---|---|---|---|
| 1,267,993 | 5/1918 | Eaton | 310/218 |
| 2,493,414 | 1/1950 | Morrison | 310/42 UX |
| 3,612,930 | 10/1971 | Raby | 310/269 |
| 4,118,645 | 10/1978 | Calfo | 310/260 |
| 4,118,648 | 10/1978 | Gillet | 310/269 |
| 4,227,109 | 10/1980 | Mulach | 310/217 |

FOREIGN PATENT DOCUMENTS

| | | | |
|---|---|---|---|
| L 14962 | 7/1956 | Fed. Rep. of Germany | 310/269 |
| 1015121 | 9/1957 | Fed. Rep. of Germany | 310/269 |
| 52-45004 | 4/1977 | Japan | 310/269 |

Primary Examiner—R. Skudy
Attorney, Agent, or Firm—Burns, Doane, Swecker & Mathis

[57] ABSTRACT

A laminated pole for an electrical machine with salient poles is disclosed. The laminated pole includes a pole body having a plurality of pole sheets, and a pole end plate having a plurality of individual sheets. The pole sheets are layered and pressed one against another. The individual sheets are welded one to another, and may also be welded to a connecting pin. The connecting pin protrudes from the pole end plate in an axial direction and is used as a bearing or support member for a pole coil of the electrical machine. The individual sheets and the pole sheets are made from the same sheet material, have the same outside contour, and are punched with the same punching tool. Laminated pole end plates according to the present invention are cheaper to manufacture and suffer less pulsation losses and eddy current losses than solid pole end plates.

8 Claims, 2 Drawing Figures

LAMINATED SALIENT FIELD POLE PIECE FOR DYNAMOELECTRIC MACHINES

BACKGROUND OF THE INVENTION

This invention relates generally to electrical machines, such as generators and motors and more particularly to a laminated pole for an electrical machine with well-defined magnetic poles, i.e., salient field poles, in which the laminated pole body is braced by pole end plates and a prestressing means, and to a method for making a laminated pole.

In conventional electrical machine with salient poles, the rotor poles are either solid or laminated depending upon the magnitude of the mechanical stress that the pole is to be subject to. Solid poles made from forged or cast steel have relatively small ohmic resistance and therefore suffer from relatively high losses. Such losses include eddy current losses produced by the higher field harmonics generated by the armature current, as well as the pulsation losses caused by the main field through the grooving. The solid poles act as the conductor rods of a squirrel cage rotor winding, and therefore, with asynchronous operating conditions, large currents are able to flow in the poles. Since the solid pole is able to conduct large currents and is able to absorb a large amount of power, the solid pole is especially suited for the asynchronous starting of large synchronous motor generators.

Laminated poles have a relatively higher ohmic resistance in the longitudinal direction than solid poles. The attendant losses are therefore correspondingly less. However, the damping effect of laminated poles is also correspondingly less. Therefore, a damping winding is provided with a laminated pole in order that the required operating stability be achieved.

A laminated pole is fabricated from punched sheets, each sheet having a thickness of about 2 millimeters. The sheets are layered one against another in a press over a mandrel. An axial pressure is exerted against the sheets, and after a high axial pressure is reached the mandrel is welded on both ends to solid pole end plates. Additional welding seams are then added on the outside contours of the sheets while the sheets are still under pressure. If the punching or layering operations contain steps to provide for the construction of carrying catches, ventilation slots, supporting dogs for the pole windings and so forth, no further work need be done after the additional welding seams are imparted to the sheets. See, for example, "Synchronmaschinen für Wasserkraftanlagen" ["Synchronous Turbines for Hydraulic Power Stations"], CH-T 130 082 D, 1977, BBC Aktiengesellschaft, Brown, Boveri & Cie., Baden, Switzerland, at page 32.

The manufacturing processes for making pole end plates for slot-running synchronous machines from a solid steel is relatively expensive. This is especially so for hydro-generators having a large number of poles. In addition to high cost, the losses associated with solid poles and thus solid pole end plates have an adverse affect upon the operating behavior of the machine.

It is therefore an object of this invention to provide a laminated pole for an electrical machine with salient poles that is lower in loss than conventional poles, and is simple and economically feasible to produce.

According to a preferred embodiment of the present invention, the pole end plate is laminated. This reduces the manufacturing cost of the pole by about 40 to 50% when compared to the cost of using solid pole end plates. Additionally, lamination results in a pole end plate that is lighter in weight, since, due to the lamination, the filling factor is $\leq 98\%$. The reduced weight is accompanied by a reduction in the mechanical stress experienced by the pole anchoring mechanism. Still further, the pulsation losses and eddy current losses of the laminated pole end plate are less than those of a solid end plate.

BRIEF DESCRIPTION OF THE DRAWINGS

The preferred embodiments of the invention are described with reference to the accompanying drawings wherein like members bear like reference numerals and wherein.

DETAILED DESCRIPTION OF THE PREFERRED EMBODIMENTS

Figure 1:
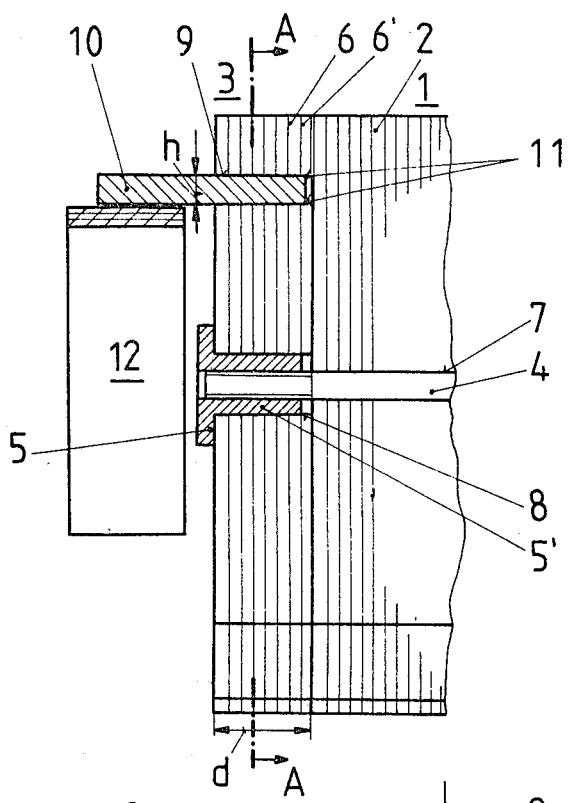
FIG. 1 is a cross-sectional view of a laminated pole for an electrical machine according to the present invention.

Referring to FIG. 1, a laminated pole for an electrical machine with salient poles includes a pole body 1 and a pole end plate 3. The pole body 1 includes a plurality of pole sheets 2 axially layered one against another. The pole sheets 2 are stressed together from both axial ends by pole end plates 3 (only one pole end plate is illustrated in FIG. 1) and by a pre-stressing means which includes a tension rod 4 and a locking member 5 which mates with the tension rod. The tension rod 4 may threadedly engage the locking member 5, or the locking member may slide about the tension rod and be welded in place. Non-essential details such as cooling air holes are not illustrated in the Figures.

The pole end plates 3 include a plurality of individual sheets 6 axially layered one against another. Boreholes 8 included in the individual sheets 6 align with boreholes 7 included in the pole sheets 2, and the aligned boreholes receive the pre-stressing means. The boreholes 7 receive the tension rod 4, and the boreholes 8 which are larger in diameter than the boreholes 7, receive the flange 5' of the locking member 5.

Figure 2:
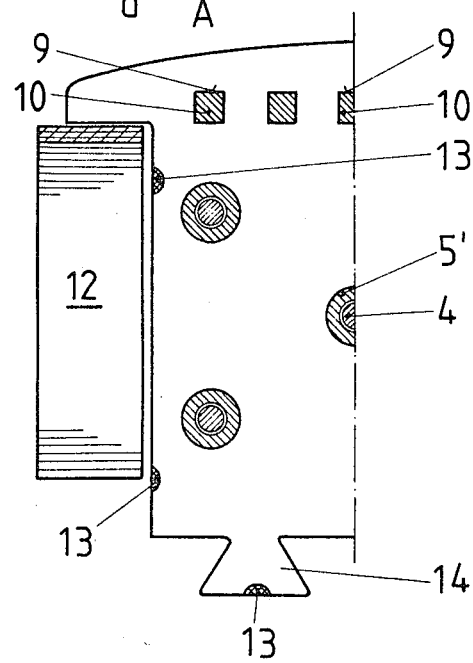
FIG. 2 is a view through the line A—A of FIG. 1.

The individual sheet 6 includes, in addition to the borehole 8, a recess 9. The recess 9 is situated near the pole cap, and is rectangular in cross-section (FIG. 2). When the individual sheets 6 are layered one against another, the recesses 9 align to form a through-hole in the pole end plate 3. A connecting pin 10 is inserted into the throughhole. The connecting pin has a cross-section corresponding to that of the recess 9. The connecting pin is welded to at least the outermost individual sheet 6' at welding points 11.

The connecting pin 10 protrudes out from the pole end plate 3 in the axial direction. The protruding portion of the connecting pin serves as a bearing or holding member for a pole coil 12 of the electrical machine. By supporting the pole coil in such a manner the heavy and expensive pole coil support systems conventionally used in electrical machines are not required, thereby further reducing the weight of the pole.

The connecting pin 10 has a radial thickness h, and the axial thickness d of the pole end plate 3 is preferably greater than or equal to 2h.

The pole end plate 3 preferably has a thickness in the range of from 40 to 60 millimeters, and the thickness of the pole end plate is independent of the axial length of the pole body 1.

The individual sheet 6 preferably has a thickness ranging up to 3 millimeters. Preferably, the pole sheet 2 has a thickness corresponding to that of the individual sheet 6. Thus, the pole sheets and the individual sheets can be punched out of the same sheet of material.

According to another embodiment of the present invention, the pole sheet 2 and the individual sheet 6 have the same outside contours, and, accordingly, can be punched with the same punching tool.

Once the individual sheets 6 are layered one against another, they are welded together, at least on their outer contours, at a number of points.

According to still another embodiment of the present invention, the individual sheet 6 includes at least one additional recess. The recesses are aligned when the individual sheets are layered one against another, thus forming a through-hole in the pole end plate 3. A pin of appropriate cross-section is inserted into the through-hole and is welded to the outermost individual sheet at each end or surface of the pole end plate. This embodiment affords a mechanically compact pole end plate that is highly resistant to operating stresses.

Referring to FIG. 2, a view through the line A—A of FIG. 1 is illustrated. The individual sheet 6 includes a plurality of welding notches 13 at which the individual sheets are welded one to another. A catch 14 is also included on the individual sheet 6.

According to a preferred method for making a laminated pole according to the present invention, a plurality of pole sheets 2 and a plurality of individual sheets 6 are each punched with the same punching tool from the same sheet of material. During the punching process, the borehole 7 is punched into the pole sheet 2, and a corresponding borehole is punched into the individual sheet 6. The borehole in the individual sheet 6 is then expanded in diameter to form the borehole 8, and the recess 9 is punched into the individual sheet 6.

If the punching tool used to punch the pole sheet 2 and the individual sheet 6 did not punch out welding notches distributed over the outer contour of the pole sheet 2 and the individual sheet 6, welding notches 13 are now located laterally on the pole sheets and individual sheets as illustrated in FIG. 2.

The individual sheets 6 are now layered one against another in a packet ranging from 40 to 60 millimeters in thickness, and are pressed together in a pressing device (not illustrated). While under pressure, the individual sheets are welded one to another along the welding notches 13. The connecting pin or mandrel 10 is then inserted into the throughhole formed by the recesses 9, and welded at the points 11 to at least the outermost individual sheet 6'. Pole sheets 2 are then layered between two pole end plates and the pole end plates pressed axially toward one another, stressing the pole sheets. The tension rod 4 is inserted into the borehole 7. Locking members 5 are inserted into the boreholes 8 and mate with the tension rod 4.

In yet another embodiment of the present invention, the individual sheets 6 are glued one to another.

In still yet another embodiment of the present invention, the entire pole, including the pole coil, is impregnated with an impregnating resin under vacuum and subsequently under pressure, thereby essentially gluing the individual sheets one to another.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A laminated pole for a dynamoelectric machine having salient poles, said pole comprising:
    a laminated pole body defining first and second axial ends and comprising a plurality of first sheets axially layered one against another in unbonded relationship;
    first and second laminated pole end plates juxtaposed with said first and second axial ends, respectively, of said pole body, each of said end plates comprising a plurality of second sheets, having substantially the same outer contour as said first sheets and being of approximately three millimeters or less in thickness, axially layered one against another and fixedly bonded together to provide a plate thickness of between approximately forty and sixty millimeters; and
    pre-stressing means for urging said first and second end plates together and thereby pressing said first sheets together.

2. The laminated pole of claim 1 wherein said second sheets are bonded together by welding said second sheets to one another at least on their outer contours at a plurality of points.

3. The laminated pole of claim 1 wherein said second sheets are bonded together by gluing.

4. A laminated pole according to claim 1 further comprising a connecting pin having a first cross-sectional contour, and wherein the second sheets of at least one of said end plates include a recess having a second cross-sectional contour, and said recess accomodates said connecting pin.

5. A laminated pole according to claim 4 wherein the first cross-sectional contour is substantially equal to the second cross-sectional contour.

6. A laminated pole according to claim 4 wherein the connecting pin is welded to at least one individual sheet of said second sheets.

7. A laminated pole according to claim 4 wherein the connecting pin protrudes beyond the at least one end plate in an axial direction, said protruding portion of the connecting pin being adapted to support a pole coil of the dynamoelectric machine.

8. A laminated pole according to claim 1 wherein said pre-stressing means comprises a tension rod and a locking member adapted to mate with the tension rod, wherein said first sheet includes a first borehole and said second sheet includes a second borehole, and wherein said first and second boreholes are in axial alignment and accommodate said pre-stressing means.

* * * * *